United States Patent [19]

Eisele et al.

[11] 4,044,115

[45] Aug. 23, 1977

[54] PRODUCTION OF ALUMINA MONOHYDRATE FROM ALUMINUM NITRATE SOLUTIONS

[75] Inventors: Judith A. Eisele, Verdi; Barlane R. Eichbaum; Donald J. Bauer, both of Reno, all of Nev.

[73] Assignee: The United States of America as represented by the Secretary of the Interior, Washington, D.C.

[21] Appl. No.: 702,262

[22] Filed: July 2, 1976

[51] Int. Cl.² ........................ C01F 7/30; C01F 7/34
[52] U.S. Cl. ............................ 423/631; 423/127; 423/132; 423/390
[58] Field of Search ............. 423/625, 631, 390, 127

[56] References Cited

U.S. PATENT DOCUMENTS

| | | | |
|---|---|---|---|
| 2,737,445 | 3/1956 | Nossen | 423/390 |
| 3,366,446 | 1/1968 | Kelly et al. | 423/625 |
| 3,647,373 | 3/1972 | Heiska et al. | 423/631 |
| 3,864,462 | 2/1975 | Bruen et al. | 423/631 |
| 3,869,543 | 3/1975 | Schutle et al. | 423/631 |

FOREIGN PATENT DOCUMENTS 367,525  2/1932  United Kingdom .............. 423/631

Primary Examiner—Herbert T. Carter
Attorney, Agent, or Firm—William S. Brown; Donald A. Gardiner

[57] ABSTRACT

Alumina monohydrate is produced by treating aluminum nitrate solution at a temperature of about 250° to 350° C and a pressure of about 500 to 2500 psig.

3 Claims, No Drawings

PRODUCTION OF ALUMINA MONOHYDRATE FROM ALUMINUM NITRATE SOLUTIONS

This invention relates to an improvement in process for production of alumina from clays, such as kaolin. Such processes conventionally involve an initial leach of the calcined clay with a mineral acid, generally nitric acid, to dissolve the aluminum as aluminum nitrate. Iron, which is also leached, must be separated from the leach liquor prior to recovery of alumina. A variety of prior art processes have been developed for this purpose, including those of U.S. Pat. No. 3,221,521 and U.S. application Ser. No. 639,024.

$Al(NO_3)_3 \cdot 9H_2O$ crystals are recovered from the purified leach liquor by removing enough water to cause crystallization when the solution is cooled. $Al(NO_3)_3 \cdot 9H_2O$ can be decomposed to $Al_2O_3$ either by direct roasting or in a two step process where a basic aluminum nitrate is formed at a low temperature (around 150° C) and the basic nitrate is then roasted to $Al_2O_3$. The disadvantage of crystallizing $Al(NO_3)_3 \cdot 9H_2O$ and roasting it is that energy consumption is very large, a large heat input being required for vaporization of the excess water and for roasting the $Al(NO_3)_3 \cdot 9H_2O$.

It has now been found, according to the process of the invention, that alumina monohydrated, AlOOH, may be produced directly from the purified aluminum nirate leach liquor without evaporation of water, thereby substantially reducing energy consumption. In addition, the AlOOH may be roasted to $Al_2O_3$ with considerably less energy consumption than that required for roasting of $Al(NO_3)_3 \cdot 9H_2O$ to $Al_2O_3$. The process of the invention consists of treatment of the leach liquor, or other aluminum nitrate solution, at a temperature of about 250° to 350° C and a pressure of about 500 to 2500 psig for a time sufficient to convert a major proportion of the aluminum nitrate to alumina monohydrate according to the reaction

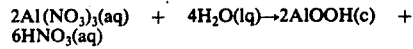

Leach liquors suitable for treatment according to the process of the invention will typically consist essentially of aqueous solutions of aluminum nitrate nonahydrate containing about 0.5 to 7.2 weight percent of aluminum. The process is preferably carried out in an autoclave by means of which the required pressure is produced autogenously when the temperature is adjusted to the required value. Optimum reaction time will vary with temperature and pressure, as well as concentration of the solution, but generally a period between about 1 and 6 hours will be sufficient.

The reaction mixture is then cooled to room temperature and the granular precipitate of AlOOH separated by conventional means such as filtration. The AlOOH may be readily converted to $Al_2O_3$ by roasting at a temperature of about 900° to 1300° C. The recovered $HNO_3$ can be recycled to leach additional clay.

The following example will serve to more specifically illustrate the invention.

EXAMPLE

A charge of 150g Al $(NO_3)_3 \cdot 9H_2O$ and 300g $H_2O$ was put in an autoclave. The temperature was raised to 275° C and held at that value for four hours, an autogenous pressure of 950 psig being generated. After cooling, 16.9g of precipitate was recovered and identified by X-ray diffraction as primarily $\gamma AlOOH$, representing 70 percent Al recovery.

We claim:

1. A method for production of alumina monohydrate consisting of treating an aqueous solution of aluminum nitrate containing about 0.5 to 7.2 weight percent aluminum at a temperature of about 250° to 350° C and a pressure of about 500 to 2500 psig for a time sufficient to convert a major proportion of the nitrate to monohydrate, cooling the reaction mixture to room temperature and separating the precipitated alumina monohydrate.

2. The method of claim 1 in which the reaction time is about one to six hours.

3. The method of claim 1 in which the reaction temperature is about 275° C, the pressure is about 950psig, and reaction time is about 4 hours.